No. 663,222. Patented Dec. 4, 1900.
C. A. DENNEY & U. G. SILVERS.
DEVICE FOR CUTTING NOODLES OR DUMPLINGS.
(Application filed Feb. 16, 1900.)
(No Model.)
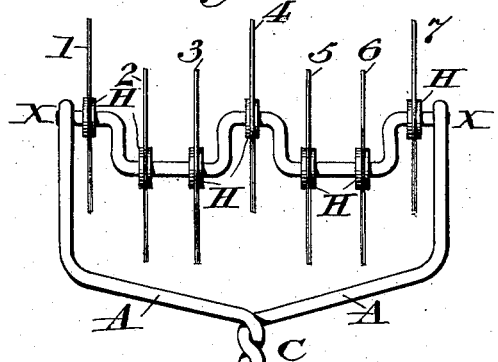
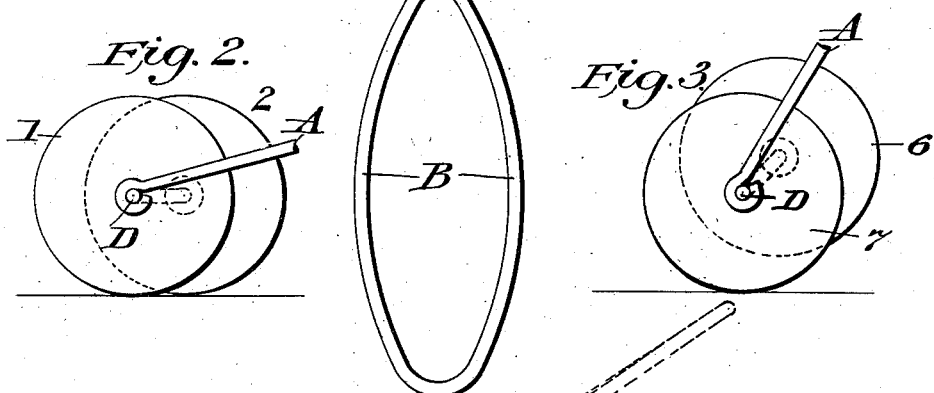
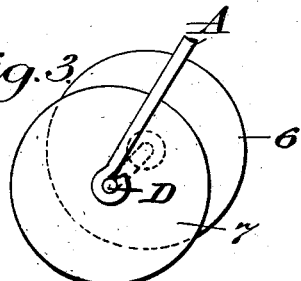
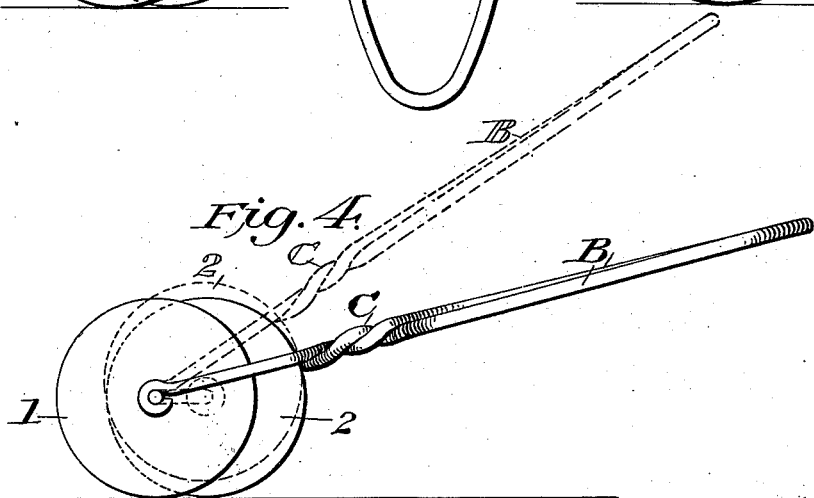
Witnesses:
R. E. Randle
Katherina Emerson.
Inventors,
C. A. Denney
and U. G. Silvers.
By their attorney
Robert W. Randle.

UNITED STATES PATENT OFFICE.

CHARLES A. DENNEY AND ULYSSES G. SILVERS, OF PORTLAND, INDIANA.

DEVICE FOR CUTTING NOODLES OR DUMPLINGS.

SPECIFICATION forming part of Letters Patent No. 663,222, dated December 4, 1900.

Application filed February 16, 1900. Serial No. 5,431. (No model.)

*To all whom it may concern:*

Be it known that we, CHARLES A. DENNEY and ULYSSES G. SILVERS, citizens of the United States, residing at Portland, in the county of Jay and State of Indiana, have invented certain new and useful Improvements in Devices for Cutting Noodles or Dumplings and the Like, of which the following is a specification.

Our invention relates to improvements in a noodle and dumpling cutter in which the cutting is done by revolving circular cutting-disks operated by hand-power; and the objects of our invention are, first, to provide a noodle and dumpling cutter that can be operated by hand-power by providing cutting-disks journaled on a common axle and provided with a handle; second, to provide a device that will cut dough into narrow strips for noodles and by turning the device over it will cut wider strips of dough for dumplings, and, third, to provide a new article of manufacture in a noodle and dumpling cutter that can be manufactured and sold at a very low price. We attain these objects by the mechanism and arrangement of parts illustrated in the accompanying drawings, in which—

Figure 1 is a vertical view of our entire device. Fig. 2 is an end view of our device, showing the device arranged so that all the cutting-disks will come into contact with the base-level or the dough to be cut. Fig. 3 is also an end view of the device, showing the device turned over, so that only three of the cutting-disks will come in contact with the base-level or dough to be cut. Fig. 4 is a view of our device, showing the axle set at an angle with reference to the arms.

Similar letters and figures refer to similar parts in all the views.

The arms A A and the handle B, together with the axle D, constitute the framework of our device, and these parts can be made of wire bent into the form shown in Fig. 1.

The axle D is rigidly secured to the arms A A at X X. Journaled on said axle are cutting-disks 1 2 3 4 5 6 7 and they are provided with suitable bearings or journals H, H, H, H, H, H, and H.

The arms A A meet at C, where they can be twisted or otherwise secured together, and then extend downward to form the handle B.

It can be seen that if our device be located as in Fig. 2 all the disks will come in contact with the board or table on which it is proposed to operate the device, and in this position if the device be pushed over a layer of dough it will cut the dough into strips of a width equal to the distance between any two of the disks or knives.

By turning the device over, as shown in Fig. 3, it will be seen that only four of the disks will be elevated from contact with the dough, so that only the disks 1, 4, and 7 will come in contact with the dough to be cut.

It is apparent that the change from a noodle-cutter to a dumpling-cutter, as described, is caused by the construction and the arrangement of the axle D, as shown in Fig. 1. The front of said axle, as shown in Fig. 1, is set at an angle with reference to the arms A A, as will be apparent from the position of the disks in Figs. 2 and 3.

Our improved noodle and dumpling cutter is perfectly adapted to accomplish the results for which it is intended, and it is evident that changes in and modifications of the construction herein described may be made without departing from the spirit of our invention or sacrificing its advantages. It is also apparent that our device can be used for analogous purposes, and we do not limit it to the purposes named.

Having described our invention, what we claim, and desire to secure by Letters Patent of the United States, is—

1. In a noodle and dumpling cutter, the combination of the arms A, A, united at C and extending down to form a handle B, of an axle D set at an angle to the arms and rigidly secured thereto and bent in the form shown and having cutting-disks journaled thereon, all as described and set forth.

2. In a noodle and dumpling cutter, the combination with the handle, of an eccentrical axle, cutting-disks mounted thereon adapted to cut strips of plastic material of certain widths by revolving over the material to be cut and by changing the position of the handle to cut strips of other widths, all as described and set forth.

In testimony whereof we have signed our names to this specification in the presence of two subscribing witnesses.

CHARLES A. DENNEY.
ULYSSES G. SILVERS.

Witnesses:
WILLIAM L. GRARD,
JOHN F. LAFOLLETTE.